United States Patent [19]
Cassel et al.

[11] Patent Number: 5,588,680
[45] Date of Patent: Dec. 31, 1996

[54] PIPE LAP JOINT WITH IMPROVED COLLAPSIBLE SEALING ZONE

[75] Inventors: Scott T. Cassel, Bloomfield Hills; Michael E. Amedure, Orion, both of Mich.

[73] Assignee: BKS Company, Birmingham, Mich.

[21] Appl. No.: 566,726

[22] Filed: Dec. 4, 1995

Related U.S. Application Data

[63] Continuation-in-part of Ser. No. 359,531, Dec. 20, 1994, abandoned.

[51] Int. Cl.⁶ ............................................. F16L 35/00
[52] U.S. Cl. ......................... 285/3; 285/382; 285/403; 285/420; 285/424; 83/687
[58] Field of Search ................................ 285/382, 420, 285/424, 4; 83/686, 687, 691

[56] References Cited

U.S. PATENT DOCUMENTS

| | | | |
|---|---|---|---|
| 4,056,273 | 11/1977 | Cassel | 285/337 |
| 4,113,289 | 9/1978 | Wagner et al. | 285/382.1 |
| 4,629,226 | 12/1986 | Cassel et al. | 285/382 |
| 4,660,862 | 4/1987 | Cassel et al. | 285/114 |
| 4,753,462 | 6/1988 | Liu | 285/420 |
| 4,902,049 | 2/1990 | Umehara | 285/347 |

*Primary Examiner*—Dave W. Arola
*Attorney, Agent, or Firm*—Reising, Ethington, Barnard & Perry

[57] ABSTRACT

A pipe lap joint is disclosed with an improved sealing zone and which comprises a pair of end-to-end intersecting slots in the outer pipe which allow the sealing zone to be collapsed against the inner pipe by a band clamp around the outer pipe. The outboard slot extends inwardly from the end of the pipe and the inboard slot is circumferentially offset and extends inwardly from the outboard slot. A frangible bridging segment of the wall of the pipe extends between the adjacent walls of the two slots and is deformed or fractured and maintains isolation between the slots when the pipe is collapsed. To facilitate collapse of the outer pipe, the length of the inboard slot is maximized for increased leverage of the clamping force.

18 Claims, 5 Drawing Sheets

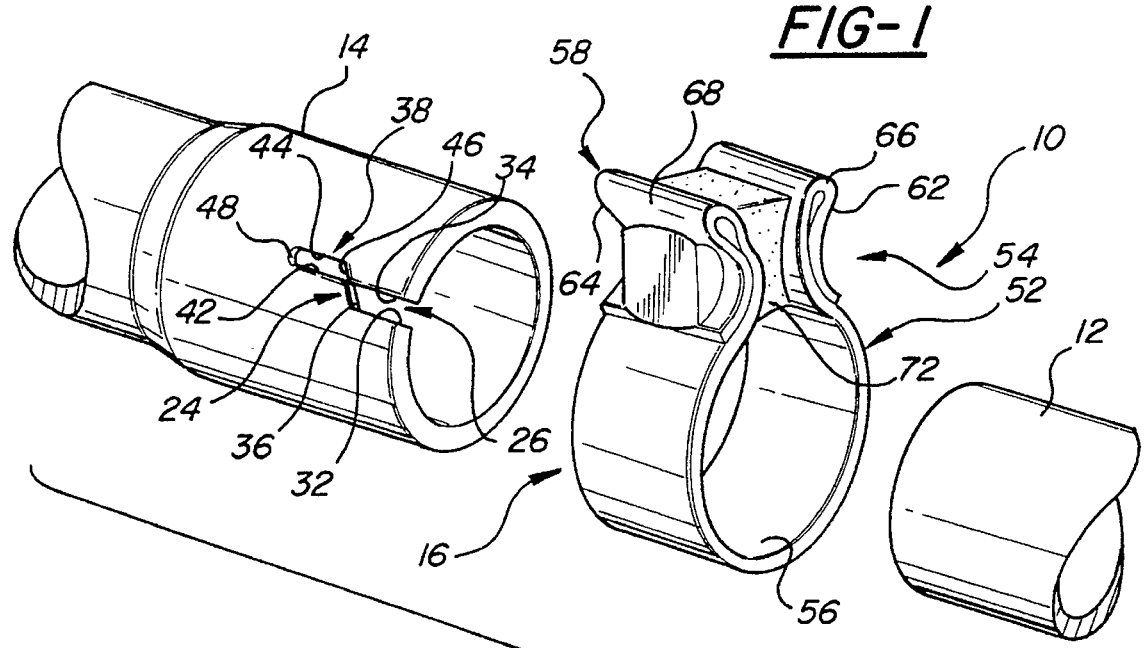
FIG-1
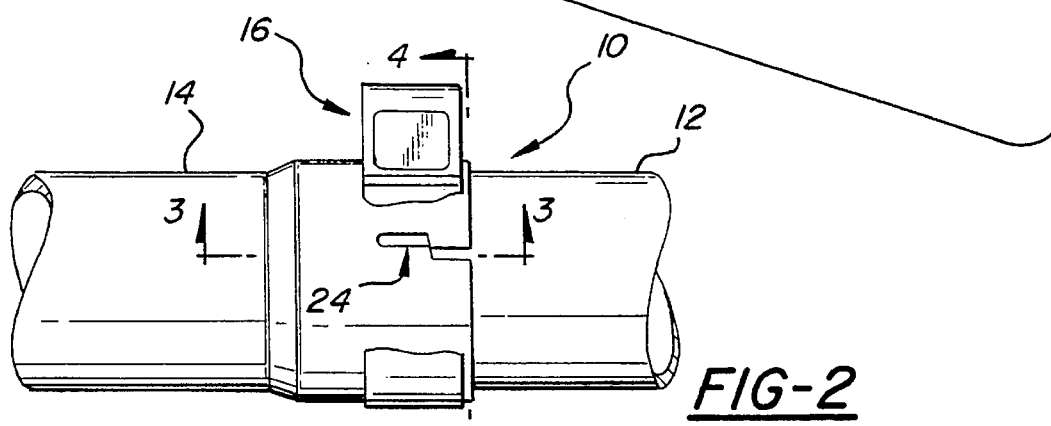
FIG-2
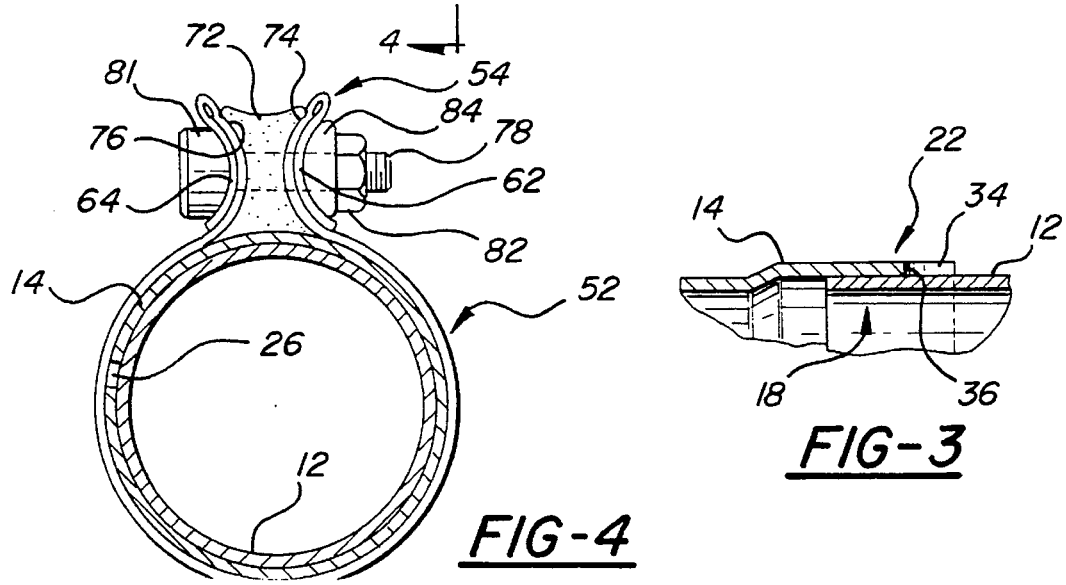
FIG-3
FIG-4

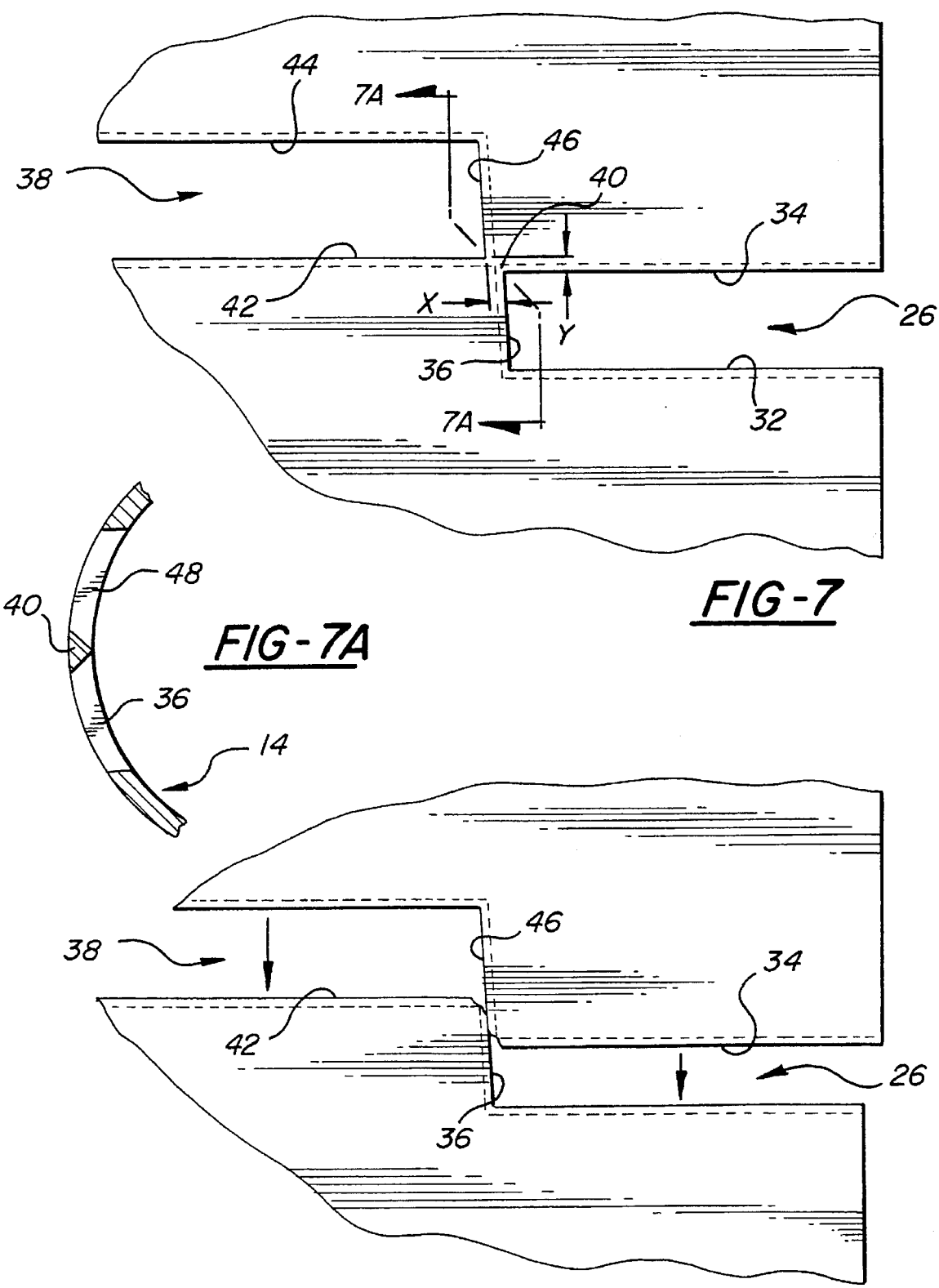

5,588,680

PIPE LAP JOINT WITH IMPROVED COLLAPSIBLE SEALING ZONE

This is a continuation in part of application Ser. No. 359,531 filed Dec. 20, 1994, and now abandoned.

FIELD OF THE INVENTION

This invention relates to pipe couplings; more particularly it relates to a pipe lap joint especially adapted for use in vehicle exhaust systems.

BACKGROUND OF THE INVENTION

In certain applications such as vehicle exhaust systems it is desired to provide a pipe joint with high pull-apart strength and with a good fluid seal between the pipes. It has become increasingly important, especially in connection with vehicle exhaust systems, to achieve greater reliability and uniformity in providing pipe couplings with a good fluid seal.

In the prior art, a pipe coupling which provides high strength and a good fluid seal has been provided by a pipe lap joint having a collapsible sealing zone and a band clamp as disclosed and claimed in Cassel U.S. Pat. No. 4,629,226 granted Dec. 16, 1986. In the lap joint of that patent, a collapsible sealing zone is provided in the outer pipe by at least one pair of intersecting end-to-end slots which afford relief for circumferential contraction of the sealing zone within the overlap region of the pipe ends. A clamping band is disposed around the outside pipe and covers the inboard slot. The clamping band is tightened around the outside pipe to clamp the pipes together and to collapse the sealing zone of the outer pipe into close fitting engagement with the inner pipe and thereby cause sealing engagement of the outer pipe with the inner pipe and with the band. The intersecting slots comprise an outboard slot and an inboard slot. The outboard slot has sidewalls extending inwardly from the end of the outside pipe and terminating in a transverse inner end wall within the overlap region of the pipes. The inboard slot is circumferentially offset from the outboard slot with sidewalls extending axially inwardly from an outer end wall. The adjacent sidewalls of the slots are in substantial alignment with each other and the end walls are in substantial alignment with each other. When the overlap region of the outer pipe is collapsed into close fitting engagement with the inner pipe, the end walls of the slots are moved into engagement with each other and thereby isolate the slots from each other and provide a seal.

The lap joint of the aforementioned U.S. Pat. No. 4,629,226 utilizes a pair of slots which intersect each other at adjacent corners with the outer pipe in an uncollapsed state. The inner pipe and outer pipe walls are telescoped together in a loose fit to form the lap joint. The manufacturing tolerances of the pipe diameters result in a large percentage of the mated pipes having a sufficiently loose fit that the outer pipe is collapsed sufficiently by the band clamp that the end walls of the slots are moved into engagement with each other to isolate the inboard and outboard slots. However, there is some small percentage of mating pipes in which the initial fit is so close that tightening of the band clamp causes very little collapse of the outer pipe before it is in close fitting engagement with the inner pipe and there is insufficient displacement to cause the edge-to-edge engagement of the end walls of the slots which is necessary to provide isolation between the two slots. This may lead to undesirable leakage in some of the pipe joints.

In the earlier prior art, it was known to use a collapsible sealing zone at the free end of the outer pipe which is collapsed into sealing engagement with the inner pipe by a clamping band. A pipe lap joint of this type is disclosed in Wagner et al. U.S. Pat. No. 4,113,289 granted Sep. 12, 1978. The collapsible sealing zone in the Wagner et al. patent comprises several sets of slots which are disposed circumferentially around the end of the outer pipe. In each set of slots there is an open slot which extends inwardly from the end of the pipe and an adjacent closed slot, i.e. one which does not extend to the end of the pipe. The difficulty with this sealing zone is that the slot structure exhibits a high resistance to collapsing and accommodates a relatively small amount of reduction in the circumference of the pipe at each set of slots.

A lap joint of the type using a collapsible sealing zone is also disclosed in Cassel U.S. Pat. No. 4,056,273. In the joint of this patent, a collapsible sealing ring forms an extension of the outer pipe but is separate from it. The sealing ring is split so as to form a tongue on each free end with the tongues having complementary ramp surfaces in engagement with each other and which slide relative to each other when the ring is contracted or collapsed. This sealing ring provides a good seal but the structure is not adapted to a sealing ring which is integral with the pipe end.

A general object of this invention is to overcome certain disadvantages of the prior art and to provide a pipe lap joint with an improved sealing zone.

SUMMARY OF THE INVENTION

In accordance with this invention, a pipe lap joint is provided which exhibits improved fluid sealing between the parts despite dimensional variations thereof within allowable manufacturing tolerances. The pipe lap joint also exhibits high pull-apart strength and is economical to manufacture.

Further, in accordance with this invention, improved fluid sealing properties are provided in a pipe lap joint of the type in which the overlap region of the outside pipe comprises a collapsible sealing zone with at least one pair of end-to-end relief slots which accommodate circumferential contraction or collapsing of the sealing zone by a clamping band around the outside pipe. In accordance with the invention, a fluid seal is maintained in a pipe joint when tightening of the clamp on the outer pipe around the sealing zone produces tight sealing engagement with the inner pipe regardless of whether there is any substantial contraction of the slots. This is achieved by means of non-intersecting slots which are arranged in such manner as to provide a bridging segment of the pipe wall between adjacent ends of the slots. Thus, the first and second slots are isolated from each other when the frangible bridging segment is either only slightly deformed or when it is completely fractured by collapse of the overlap region of the outer pipe.

Further, in accordance with the invention, the adjacent sidewalls of the slots are circumferentially offset from each other and are connected together by a frangible bridging segment of the wall of the outside pipe.

Further, in accordance with the invention, the adjacent end walls of the slots are axially offset from each other and are connected together by said frangible bridging segment of the wall of the outside pipe. Preferably, the frangible bridging segment of the wall is generally in the shape of a cone with the base of a cone disposed on the outside diameter of the pipe and the apex of the cone disposed on the inside diameter of the pipe.

Further, in accordance with this invention, the collapsing of the outer pipe at the sealing zone by the clamping band is facilitated by providing increased leverage in the application of the clamping force. This is achieved by making the inboard slot substantially longer than the outboard slot; preferably, the length of the outboard slot is minimized to the extent practicable for mass production of the pipe ends. This permits the inboard slot to be maximized within the width of the sealing zone under the clamp band.

Further, in accordance with this invention, the inboard slot includes transverse slot portions extending circumferentially outward around the outer pipe from the inner end of the inboard slot and giving the inboard slot a "T"-shape. The transverse slot portions allow both the inboard and the outboard slots to close together more evenly along their lengths and allows for improved sealing—particularly in applications where the outer pipe inside diameter is significantly larger than the inner pipe outside diameter.

A complete understanding of this invention may be obtained from the detailed description that follows taken with the accompanying drawings.

DESCRIPTION OF THE DRAWINGS

FIG. 1 is an exploded view of the lap joint of this invention showing the parts before they are assembled;

FIG. 2 shows the lap joint of this invention with the parts assembled and after the joint has been tightened;

FIG. 3 is a view taken on lines 3—3 of FIG. 2;

FIG. 4 is a view taken on lines 4—4 of FIG. 2;

FIG. 7 is a magnified view of the slots of FIG. 1 before the outer pipe is collapsed;

FIG. 7A is a view taken on lines 7A—7A of FIG. 7;

FIG. 8 is a magnified view of the slots of FIG. 2 after the outer pipe is collapsed.

BEST MODE FOR CARRYING OUT THE INVENTION

Figure 5:
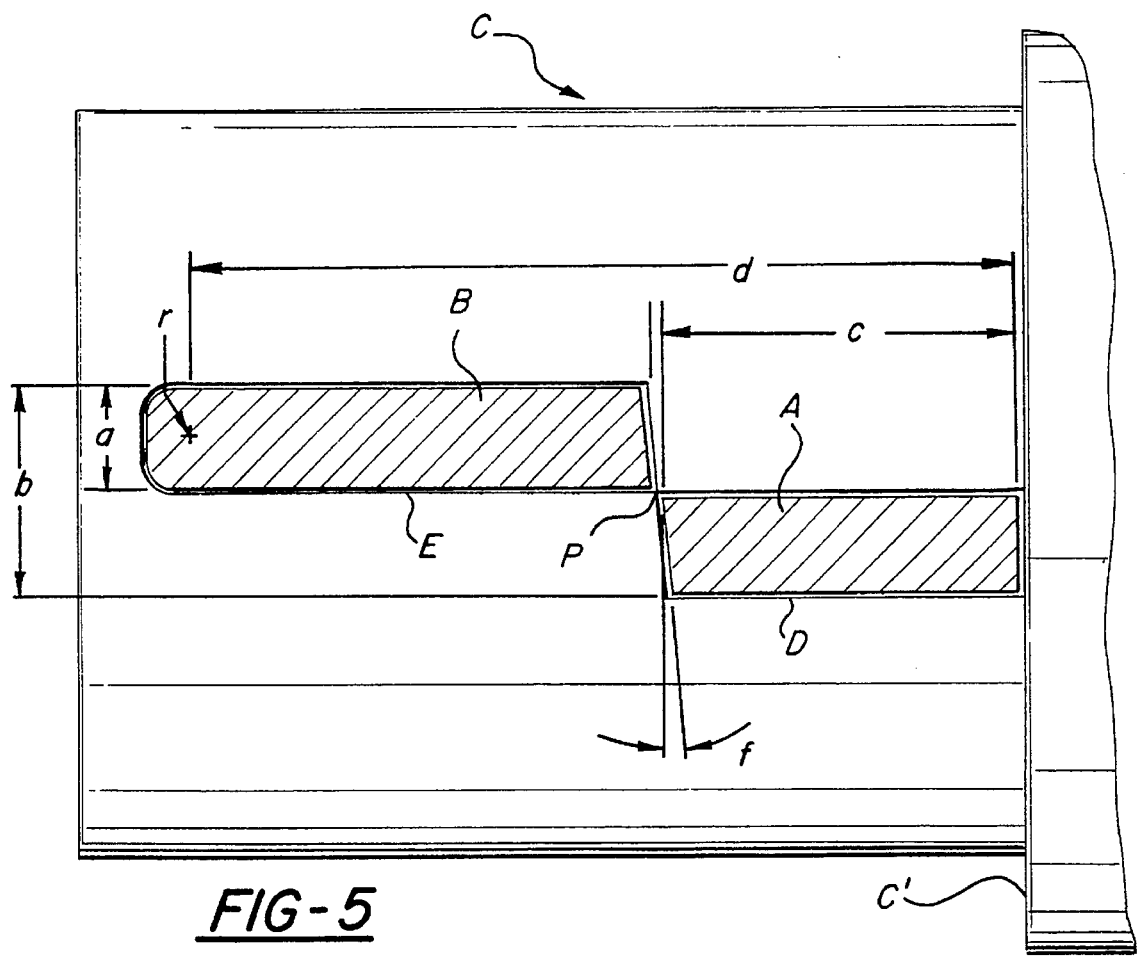
FIG. 5 is a diagram of the punch and die for forming the slots of FIG. 1.

Referring now to the drawings, there are shown illustrative embodiments of the invention in a pipe lap joint which is especially adapted for use in vehicle exhaust systems. It will be appreciated as the description proceeds that the invention is useful in other embodiments and other applications.

A first embodiment of the invention will be described with reference to FIGS. 1 through 8. As shown in the drawings, the pipe joint 10 of this invention comprises, in general, inside and outside pipes 12 and 14, respectively, in a telescoping relationship with a band clamp 16 for holding the pipes together. The outside pipe 14 has a lap portion which extends over the inside pipe 12 to provide an overlap region 18 (FIG. 3) of the pipes. In order to provide a fluid seal between the inside and outside pipes, a radially collapsible sealing zone 22 is provided on the outside pipe 14 in the overlap region 18. The collapsible sealing zone 22 will be described in detail presently.

The sealing zone 22 comprises a ring shaped portion of the free end of the outside pipe 14. It is adapted to be contracted or collapsed in the radial direction by the clamp 16 so that the sealing zone 22 is in close fitting engagement with the inside pipe 12. For this purpose, the sealing zone 22 is provided with a pair of non-intersecting slots 24 disposed in an offset end-to-end relationship. In the illustrative embodiment, only a single pair of intersecting slots is used. However, in certain embodiments it may be desirable to use two or more pairs of slots, with the pairs spaced circumferentially around the pipe.

The pair of non-intersecting slots 24 is shown in FIG. 1 before the sealing zone 22 is collapsed by the force of the clamp 16. The pair of non-intersecting slots 24 comprises an outboard slot 26 which is bounded by a pair of sidewalls 32 and 34 extending inwardly from the end of the outside pipe and terminating in a transverse inner end wall 36 within the overlap region 18. The sidewalls 32 and 34 are substantially parallel to each other and to the axis of the pipe 14 whereas the inner or inboard end wall 36 extends obliquely of the sidewalls and the pipe axis at a small angle of inclination from perpendicularity. The inboard slot 38 is bounded by a pair of sidewalls 42 and 44 extending axially inwardly from an outer or outboard end wall 46 thereof to an inner or inboard end wall 48. The end wall 46 extends obliquely of the sidewalls 42 and 44 with an inclination substantially the same as that of end wall 36. It is noted that the end walls 36 and 46 are both inclined at a small counterclockwise angle, as viewed in FIG. 7, of about four degrees from perpendicularity to the pipe axis. It will be appreciated, as the description proceeds, that as an alternative the inclination could be clockwise instead of counterclockwise. The end wall 36 of slot 26 and the end wall 46 of slot 38 are axially offset from each other by a small distance (see FIG. 7). The adjacent sidewalls, namely sidewall 34 and sidewall 42, are circumferentially offset from each other by a small distance. The slot 26 and the slot 38 are thus isolated from each other, by an interposed portion of the wall of the outer pipe. In the region of closest proximity of the slots, a small bridging segment 40 of the pipe wall integral with the pipe wall, forms a bridge between the corner formed by end wall 36 and sidewall 34 and the corner formed by end wall 46 and sidewall 42. These corners are attached to each other by the bridging segment 40 of the pipe wall as a result of the slot forming operation which will be described presently.

Figure 6:
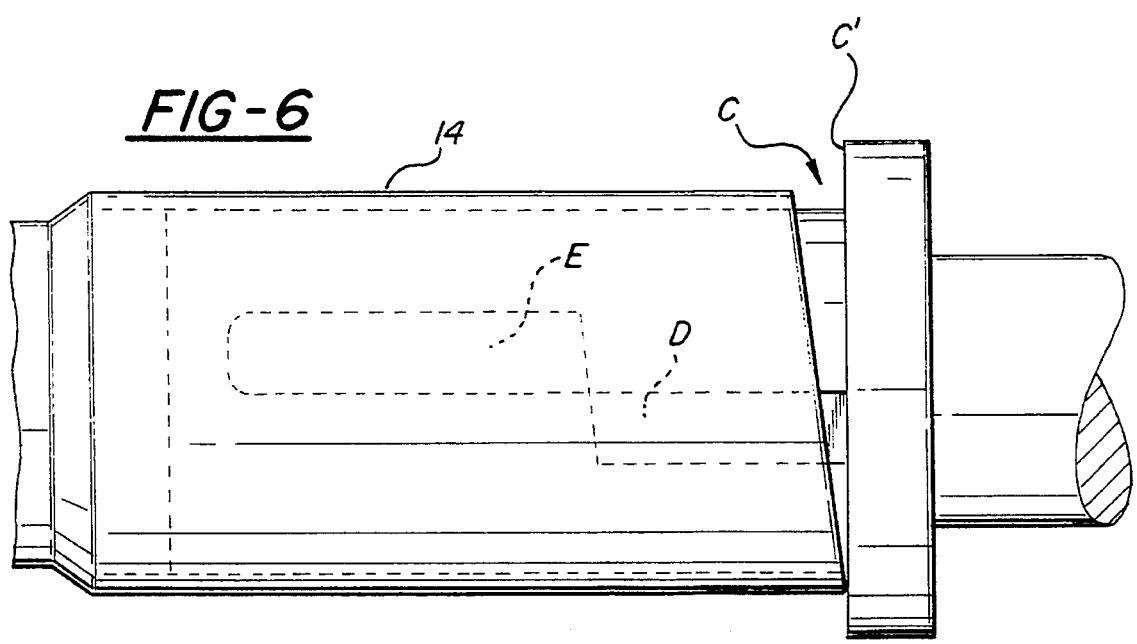
FIG. 6 is a diagram of the die of FIG. 5 with a pipe end disposed over the die.

The slots 26 and 38 are formed in the pipe 14 by a punching operation with a punch having two punch segments A and B which coact with a horn die C having two die cavities D and E. As shown in FIGS. 5 and 6, the die is disposed inside the pipe and the punch is outside the pipe; it will be appreciated, however, that the punch and die locations could be reversed. The die C is provided with an annular shoulder C' which serves as an abutment for positioning the pipe when it is loaded into the die. The die cavity D is located so that its outboard end is aligned with the abutment surface of the shoulder C'. The punch face is shown in outline form in FIG. 5 wherein the "footprint" of the punch on the outside diameter of the pipe is represented by the cross-hatched areas. The punch segments are mounted for movement in unison to punch the slots in a single stroke.

In the illustrative embodiment, the inside pipe 12 has a nominal outside diameter of 1¾ inches and an end portion of the outer pipe 14 is expanded to form a loose fit over the inside pipe. The wall thickness of the pipes is nominally 0.048 inches or 1.22 mm. The punch dimensions shown in FIGS. 5 and 7 for the illustrative embodiment are as follows: a=4.23 mm; b=8.43 mm; c=9.4 mm; d=29.8 mm; r=2.12 mm; f=4 degrees; x=0.10 mm; and y=0.20 mm. The die is constructed to mate with the punch in accordance with conventional practice. As a result, the punching operation causes the punch-out material to break away from the pipe wall around the periphery of the slots so that the slots are slightly wider and longer on the die-side of the pipe wall than on the punch-side, as shown by the dashed lines in FIG. 7.

The punch segments A and B are spaced apart at their adjacent corners by a small distance whereas the corresponding die cavities have substantially a point contact at point P. This arrangement allows the formation of the bridging segment 40 in the wall of the pipe. It is noted that the bridging segment between the slots, as punched, has a cross-sectional area which diminishes from the punch-side of the pipe to the die-side. The bridging segment, as shown in FIG. 7A, is cone-shaped with the base of the cone on the punch-side of the pipe and the apex of the cone on the die-side of the pipe. As a result, the adjacent corners of the slots are substantially touching each other at the die-side of the pipe and are spaced apart at the punch-side.

In order to facilitate the collapsing of the outer pipe in the sealing zone 22, it is desirable to maximize the effective leverage of the clamp 16. This is especially desirable in pipe couplings in which the outer pipe is of thick wall construction. For this purpose, in accordance with this invention, the axial length of the inboard slot 38 is maximized and the axial length of the outboard slot 26 is minimized. In the clamping arrangement, the end wall 48 of the inboard slot acts as a fulcrum point and the lever arm on which the clamp acts extends from the wall 48 to the outboard edge of the clamp. However, the axial location of the bridging segment 40, which exerts a significant resistance to collapsing of the outer pipe, influences, to a large extent, the amount of force which must be applied by the clamp. The bridging segment 40 must be located within the sealing zone 22, i.e. inboard of the outboard edge of the clamp 16. To make sure that this location is obtained for pipe ends that are not "square" (i.e., not perpendicular to the pipe axis), the outboard slot must have a certain minimum length in a pipe end that is square.

In order to minimize the length of the outboard slot 26 in a pipe punching operation due regard must be given to (1) the allowable pipe end out-of-square tolerance and (2) the minimum inset of the bridging segment 40 from the end of the pipe. The minimum inset is the minimum spacing of segment 40 from the end of the pipe which will provide a satisfactory isolation of the inboard slot 38 by the segment 40 from the end of the pipe. Typically, the manufacturing tolerances allow the plane of the pipe end to deviate from perpendicularity to the pipe axis by a specified maximum tolerance. This produces an out-of-square pipe end with diametrically opposite points, at the longest and shortest parts of the pipe which are axially offset by a distance depending upon the tolerance. The tolerance may be expressed in terms of a percentage, for example ten percent, of the outside diameter of the pipe as the maximum allowable offset distance. In the description that follows, the offset distance which results in a pipe end with the limiting or maximum value of tolerance will be referred to as the "maximum offset".

The pipe end out-of-square tolerance is accounted for as follows. An outer pipe 14 having an out-of-square pipe end is illustrated in FIG. 6. The die cavity D must have an axial length greater than the maximum offset; otherwise, the punch would not engage the pipe end of a pipe having the maximum offset which is loaded into the die in an angular position with the shortest part of the pipe disposed over the die cavity D.

The minimum inset of the bridging segment 40 is a function of the wall thickness of the pipe. To provide a reliable seal at the juncture of the outboard and inboard slots after collapsing of the outer pipe, the bridging segment must be spaced from the end of the pipe by a distance of at least about five times the wall thickness of the pipe.

The considerations of maximum offset and minimum inset result in an outboard slot, in a given pipe, having a length which ranges from a minimum value equal to about five times the pipe wall thickness to a maximum value equal to the sum of the maximum offset plus five times the wall thickness. The maximum value will occur in a pipe having a square end. The minimum value will occur in a pipe having a maximum out-of-square tolerance which was angularly positioned on the horn die with the shortest part of the pipe opposite the punch segment for the outboard slot. Thus, the minimum acceptable length of outboard slot will be obtained in each of a large number of pipe ends even though each pipe end has a different out-of-square value which is within the allowable tolerance. The minimum length outboard slot provides the maximum leverage for the clamping of the lap joint.

The preferred clamp for use with the invention will be described with reference to FIGS. 1, 2 and 3. The clamp 16 comprises a clamping band 52 which is disposed around the outer pipe 14 over the sealing zone 22. In particular, the clamping band 52, for sealing purposes, must cover the inboard slot 38 and cover the juncture of the end walls 36 and 46. The clamping band 52 is provided with a tightening means 54. The clamping band 52 is, for the most part, circular or roundish in cross-section. It has a roundish sector 56 adapted to fit around the sealing zone 22 on pipe 14 and a channel-shaped sector 58 which comprises a pair of sidewalls 62 and 64 extending radially outwardly from the roundish sector. The clamping band 52 is made of a single piece of sheet metal and each free end thereof is folded back on itself to form a double layer. Thus, the sidewalls 62 and 64 are of double thickness and terminate at their outer ends in respective loops or bights 66 and 68. The bights 66 and 68 serve as retaining members for holding the sidewalls in place when the tightening means 54 is tightened, as will be described subsequently.

The clamping band 52 is tightened around the pipe 14 by the tightening means 54. The tightening means comprises a reaction member or spline 72 which is disposed within the channel-shaped sector 58 and which is adapted to seat upon the outer surface of the sealing zone 22 of pipe 14. For this purpose, the spline has an inner surface of arcuate configuration conforming to the pipe 14. The spline 72 is provided with a pair of oppositely facing concave surfaces 74 and 76. The tightening means includes a bolt 78 and a nut 82. It also includes a spacer 84 disposed outside the sidewall 62 and having a convex surface which is opposite the concave surface 74 of the spline 72. The bolt 78 has a head 81 with a convex surface which is disposed outside the sidewall 64 opposite the concave surface 76 on the spline 72. The bolt extends through holes in the sidewalls 74 and 76, the spline 72 and the spacer 84.

When the pipe joint 10 is assembled and the nut 82 is tightened on the bolt 78, the relationship of the parts is as shown in FIGS. 2 and 4. It will be understood that, before the nut and bolt are tightened, the sidewalls 62 and 64 of the channel-shaped sector 58 are not seated against the spline 72. When the nut 82 is tightened, the bolt head 81 and the spacer 84 are drawn together and press the sidewalls 62 and 64 into seating engagement with the spline 72. As a result of this tightening action, the roundish sector 56 is stretched around the sealing zone 22 of the pipe 14 in tight engagement therewith. This tightening action of the clamp 16 exerts sufficient force on the sealing zone 22 to collapse the sealing zone by partially closing the slots 26 and 38 in the manner described below.

In making a lap joint of two pipes 12 and 14 which have a tight fit, there is very little room for collapsing of the outer pipe by tightening the clamp 54. This can happen in some pipe joints because of the manufacturing tolerances on the pipe sizes. In this case, tightening of the clamp 54 does result in tightening of the outer pipe 14 into close fitting engagement with the inner pipe 12 throughout the sealing band 22. However, there is very little displacement of the wall of pipe 14. Consequently, the slots 26 and 38 are narrowed only a small amount and the bridging segment 40 is somewhat stretched or torn but not broken or fractured into two separate parts. Thus, the slots 38 and 26 remain isolated from each other by the bridging segment and a good fluid seal of a joint is provided. On the other hand, when the mating pipes 12 and 14 have a looser fit because of the happenstance of manufacturing tolerances, a different action takes places upon tightening of the clamp 54. In the case where there is sufficient clearance between the pipes, the tightening of the clamp 54 will displace the metal of the outer pipe 14 in the region of the sealing zone 22 sufficiently that the bridging segment 40 will be fractured into two parts as shown in FIG. 8. As a result, the collapsing movement of the pipe wall will reduce the width of the slots 26 and 38. This causes the end walls 36 and 46 to slide against each other with continuous sealing engagement therebetween as the clamp is tightened. Due to the small oblique angle of the end walls 36 and 46 relative to the pipe axis, tight engagement therebetween is maintained. Accordingly, the slots 26 and 38 remain substantially isolated from each other and a good fluid seal of the joint is provided.

Thus, the sealing zone 22 is radially collapsed into sealing engagement with the inside pipe 12 and the clamp 16 is in sealing engagement with the sealing zone over the inboard slot 38. The engagement of the end walls 36 and 46 of the slots closes the path between the slots so that a good fluid seal of the joint is assured.

The second embodiment of the invention will be described with reference to FIGS. 9 and 10. This embodiment differs from the first embodiment which is described above, primarily in respect to the shape of the slots. More particularly, the difference resides in the relative inclination of the inboard end of the outboard slot and the outboard end of the inboard slot. This embodiment affords certain advantages which will be discussed below. In the description of this embodiment, those parts which correspond to parts described with reference to the first embodiment will be designated by the same reference character with a prime symbol added thereto.

Figure 9:
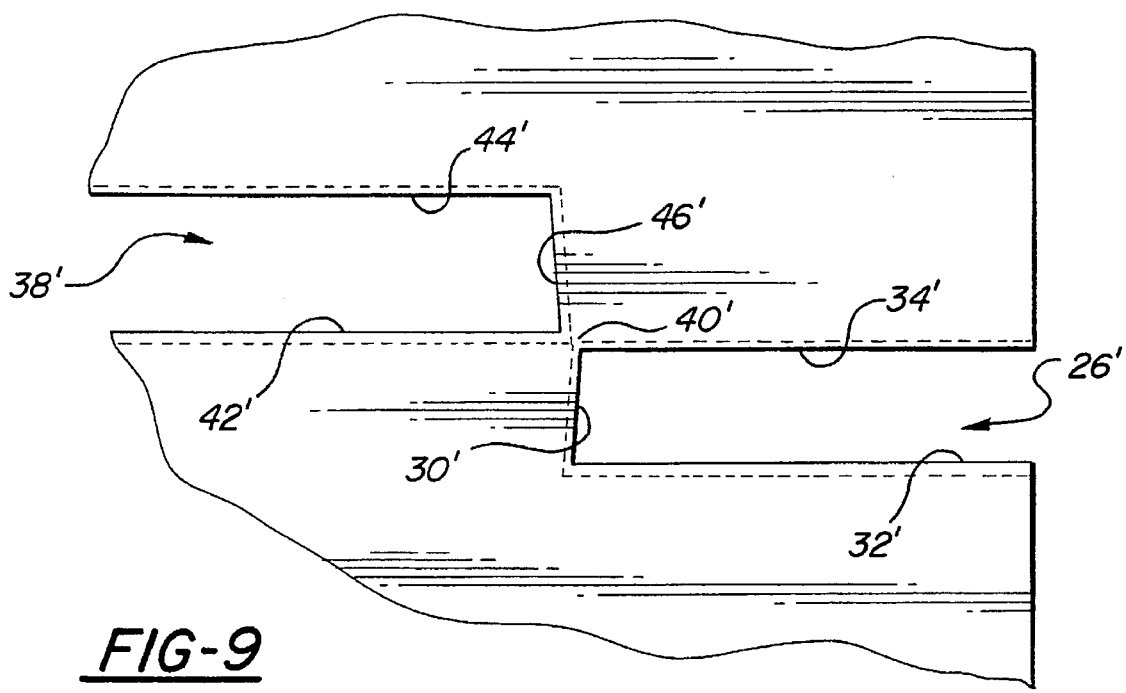
FIG. 9 shows a second embodiment of the invention in a magnified view of the slots before the outer pipe is collapsed.
Figure 10:
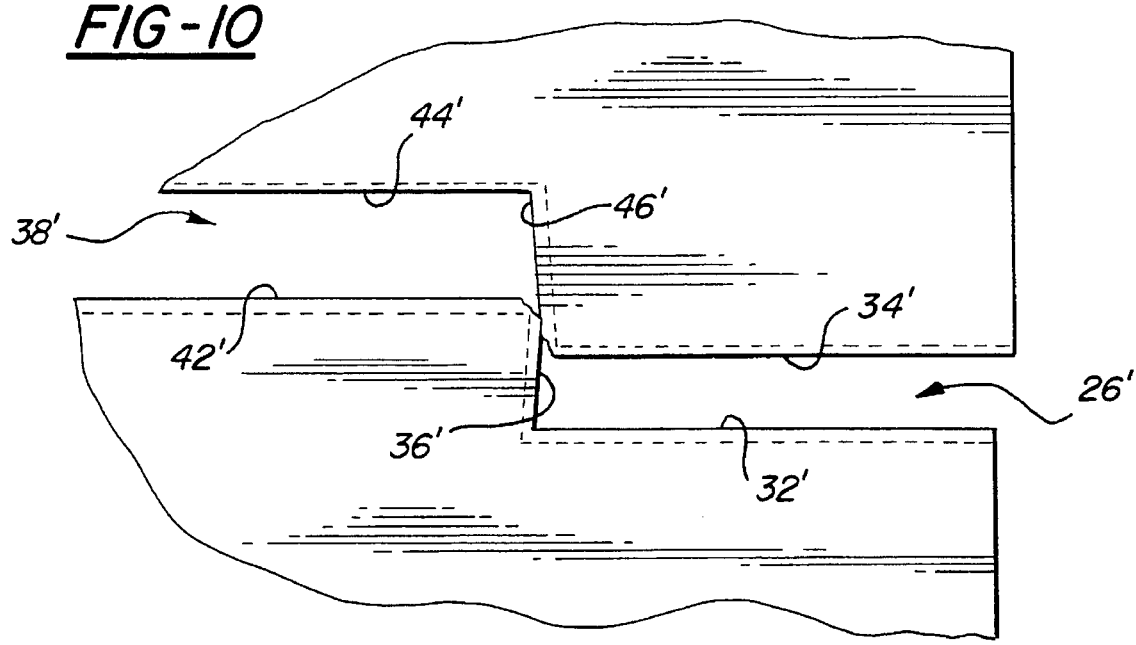
FIG. 10 shows the second embodiment in a magnified view of the slots after the outer pipe is collapsed.

The non-intersecting slots 26' and 38' are shown in FIG. 9 before the sealing zone of the pipe is collapsed by the force of the clamp. The outboard slot 26' is bounded by a pair of sidewalls 32' and 34' extending inwardly from the end of the outside pipe and terminating in a transverse inner or inboard end wall 36'. The sidewalls 32' and 34' are substantially parallel to each other and to the axis of the pipe 14 and the end wall 36' extends obliquely of the sidewalls and the pipe axis at a small angle from perpendicularity. The end wall 36' is inclined at a small clockwise angle as viewed in FIG. 9 of about four degrees from perpendicularity to the pipe axis. The inboard slot 38' is bounded by a pair of sidewalls 42' and 44' extending axially inwardly from an outer end wall 46' thereof to an inner end wall 48'. The end wall 46' extends obliquely of the sidewalls 42' and 44' with an inclination in the opposite direction from that of end wall 36'. End wall 46' is inclined at a small counterclockwise angle of about four degrees as viewed in FIG. 9 from perpendicularity to the pipe axis. The end wall 36' and the end wall 46' are axially offset and the sidewalls 34' and 42' are circumferentially offset in the same manner as described with reference to the first embodiment. Also, the slot 26' and slot 38' are isolated from each other by a small bridging segment 40' as described with reference to the first embodiment. The end wall is 36' and 46' were described above as having a clockwise angle of inclination and a counterclockwise angle of inclination, respectively; as an alternate construction, end wall 36' may have a counterclockwise inclination and end wall 46' may have a clockwise inclination with substantially the same results. As an additional alternate construction, the end wall 46' may be perpendicular to the pipe axis and the end wall 36' may have a clockwise inclination relative to the pipe axis or any other relative inclination of the end walls 36' and 46' which reduces the interference at the slot offset (represented by the bridging segment 40') to collapsing of the pipe by tightening of the clamp.

The sealing of a lap joint of two pipes 12 and 14 with the slot structure of the second embodiment is obtained in substantially the same manner as described above with reference to the first embodiment. In the case of a tight fit between the pipe ends, the slots 26' and 38' are narrowed only a small amount and the bridging segment 40' is somewhat stretched or torn but not broken or fractured into separate parts. Thus the slots 38' and 26' remain isolated from each other by the bridging segment and a good fluid seal of the joint is provided. When the mating pipes 12 and 14 have a looser fit, a different action may take place upon tightening of the clamp. Where there is sufficient clearance between the pipes, the tightening of the clamp will cause the bridging segment 40' to be fractured into two parts as shown in FIG. 10. This causes the end walls 36' and 46' to slide against each other with continuous sealing engagement therebetween as the clamp is tightened. The slots 26' and 38' remain substantially isolated from each other and a good fluid seal of the joint is provided.

An advantage of the second embodiment is that the slots 26' and 38' are allowed to collapse at a lower clamping force. This results from a reduced interference at the slot offset region when the pipe is collapsed. This is especially desirable where thick walled pipes are used. This enables tightening of the clamp into the desired sealing relationship at a reduced amount of torque on the threaded fasteners. Substantially the same sealing properties are obtained with the second embodiment as with the first embodiment.

Figure 11:
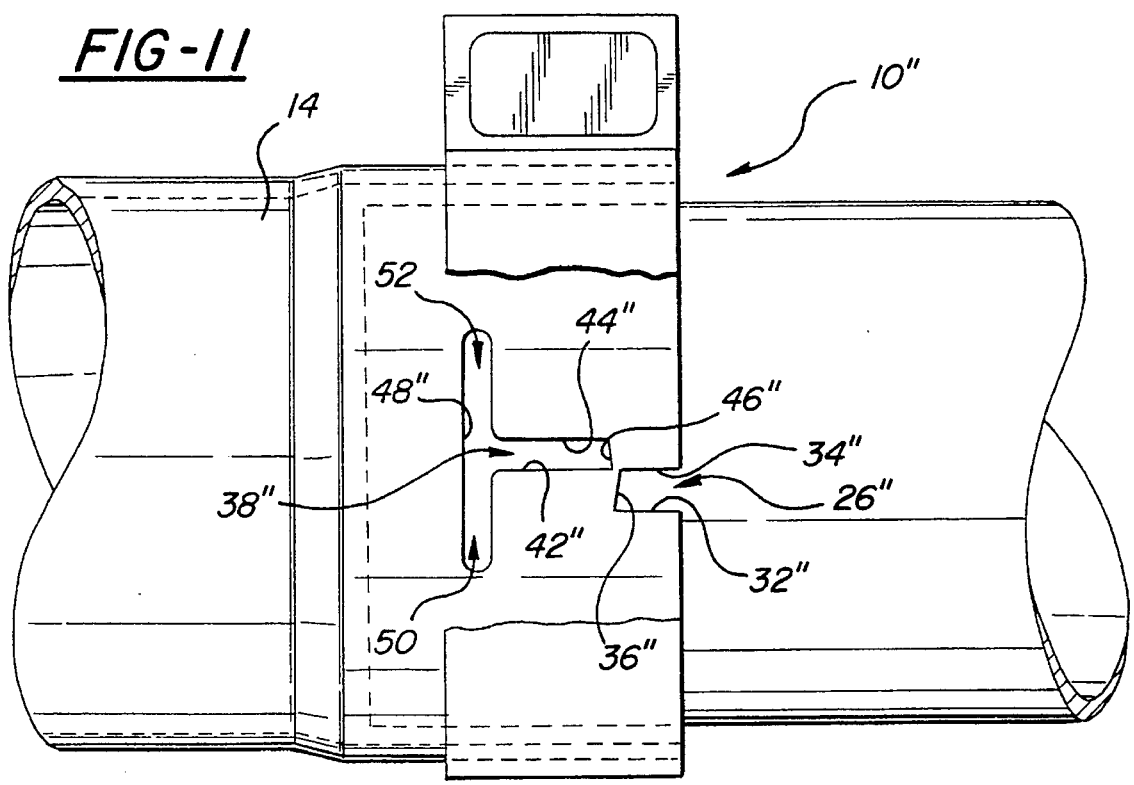
FIG. 11 shows a third embodiment of the invention in a magnified view of the slots before the outer pipe is collapsed.
Figure 12:
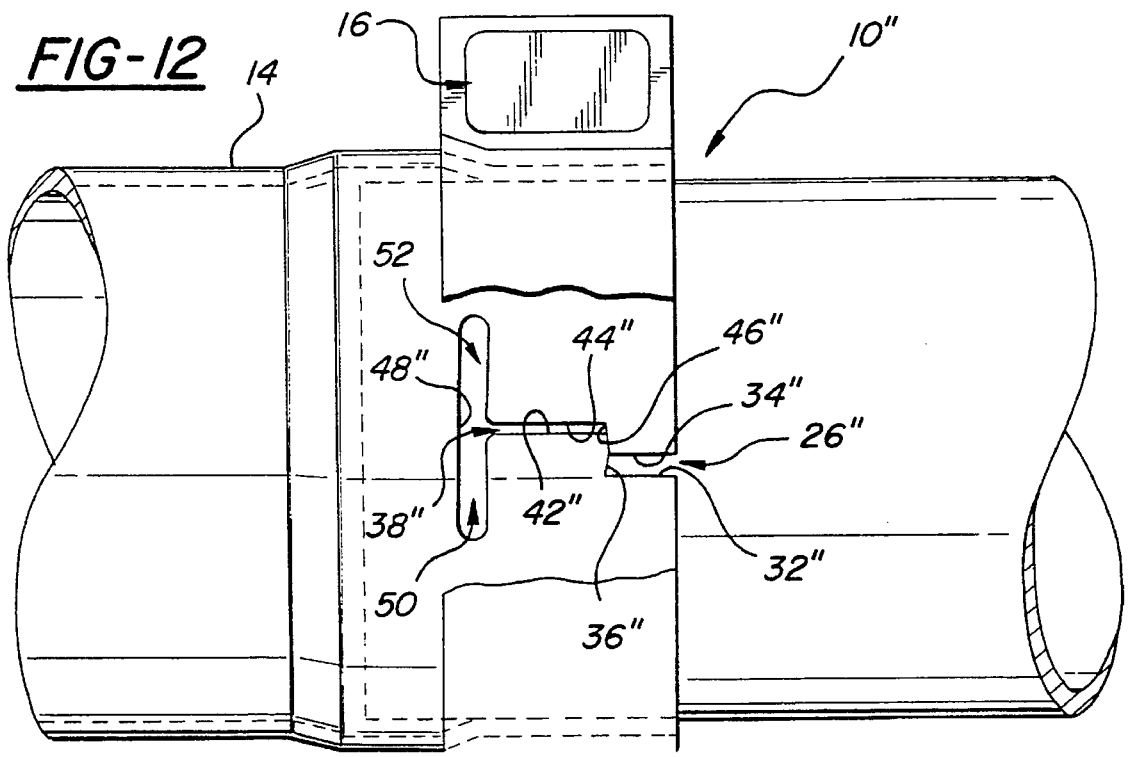
FIG. 12 shows the third embodiment in a magnified view of the slots after the outer pipe is collapsed.

A third embodiment of the invention is shown in FIGS. 11 and 12. In the description of this embodiment, those parts which correspond to parts described with reference to the first or second embodiments will be designated by adding a double-prime symbol to the same reference character.

This embodiment differs from the first and second embodiments in that the inboard slot 38" includes a pair of transverse slot portions as shown at 50 and 52 in FIGS. 11 and 12. The first transverse slot portion 50 extends circumferentially around the outer pipe 14 from a point along sidewall 42" adjacent the inboard slot inner end wall 48". Likewise, the second transverse slot portion 52 extends circumferentially around the outer pipe 14 from a point along sidewall 44" adjacent the inboard slot inner end wall 48". The addition of transverse slot portions 50 and 52 gives inboard slot 38" a "T"-shape. Transverse slot portions 50 and 52 improve the function of a sealing zone constructed according to either the first or the second embodiment of this invention. The improved function that this embodiment affords is set forth below.

FIG. 11 shows non-intersecting slots 26" and 38" before the clamp collapses the pipe sealing zone. Outboard of transverse slot portions 50, 52 slots 26" and 38" have the same configuration as the sealing zone of the second embodiment of the invention. As an alternate construction, slots 26" and 38" may have the same configuration as the sealing zone of the first embodiment.

The transverse slot portions 50, 52 extend in opposite directions around the circumference of the outer pipe 14 and lie in a plane substantially perpendicular to the axis of pipe 14. Each transverse slot portion 50, 52 extends a circumferential distance around pipe 14 that is approximately half the linear distance between said inboard slot end walls 46", 48".

A lap joint having the slot structure of the third embodiment is sealed in substantially the same manner as described above with reference to the first and second embodiments with one exception: the transverse slot portions 50, 52 of the third embodiment allow slots 26" and 38" to collapse more uniformly along their lengths. In other words, the transverse slot portions 50, 52 allow sidewalls 44" and 34" to collapse to a position more nearly parallel with sidewalls 42" and 32", respectively The more even collapse creates greater surface contact between the inner and outer pipes and therefore reduces leakage rates and increases pull-apart strength. The ability to collapse more evenly is especially desirable where a large diametrical gap exists between the mating pipes.

The slots 26" and 38" are formed in the pipe 14 by a punching operation identical to that described above with the exception that punch segment B and die cavity E are shaped to form the T-shaped inboard slot 38" described above.

Although the description of this invention has been given with reference to a particular embodiment, it is not to be construed in a limiting sense. Many variations and modifications will now occur to those skilled in the art. For a definition of the invention reference is made to the claims.

We claim:

1. In a coupling for a pipe lap joint of the type comprising:
   an inside pipe and an outside pipe having respective pipe walls in telescoping relationship which provides an overlap region on the end of each pipe, said overlap region on the outside pipe including a pair of slots, the first slot of said pair having first and second sidewalls extending axially inwardly from the end of said outside pipe and terminating in an inner end wall within said overlap region, and the second slot of said pair being spaced inwardly from the end of said outer pipe and circumferentially offset from said first slot and having first and second sidewalls extending inwardly from an outer end wall to an inner end wall, a clamping band disposed around said outside pipe and covering said second slot and the inner end of said first slot, tightening means for clamping said band around said outside pipe to clamp the pipes together and collapse outer pipe into close fitting engagement with said inner pipe within the overlap region to cause sealing engagement of said outer pipe with said inner pipe and with said band, the improvement wherein:
   said first sidewalls of the first and second slots are disposed with the outer end of the first sidewall of the second slot circumferentially offset from the inner end of the first sidewall of the first slot, said first sidewalls being connected together by a frangible bridging segment of the wall of the outside pipe,
   and said end walls extend transversely of said first sidewalls,
   whereby said first and second slots are substantially isolated from each other when said frangible bridging segment is deformed and when it is fractured into two parts by collapse of the overlap region of said outer pipe.

2. A coupling as defined in claim 1 wherein said second slot includes:
   a first transverse slot portion extending circumferentially around said outer pipe from a point along said first sidewall adjacent said second slot inner end, and
   a second transverse slot portion extending circumferentially around said outer pipe from a point along said second sidewall adjacent said second slot inner end and opposite said first transverse slot portion to allow said first and second slot to close together more evenly along their lengths upon collapse of the overlap region of said outer pipe.

3. A coupling as defined in claim 1 wherein the adjacent ends of the end walls of the first and second slots are axially offset from each other.

4. A coupling as defined in claim 3 wherein said frangible bridging element has a shape generally like that of a cone with the base of the cone on one of the outside diameter and inside diameter of the pipe and the apex of the cone on the other of the inside diameter and the outside diameter of the pipe.

5. A coupling as defined in claim 3 wherein said frangible bridging element has a shape generally like that of a cone with the base of the cone on the outside diameter of the pipe and the apex of the cone on the inside of the diameter of the pipe.

6. A coupling as defined in claim 1 wherein the distance from the end wall of the first slot to the end of the pipe is smaller than the distance from the end of the outer end wall of the second slot to the end of the pipe.

7. A coupling as defined in claim 1 wherein at least a portion of the outer end wall of the second slot extends obliquely of the axis of the outer pipe.

8. A coupling as defined in claim 1 wherein at least a portion of the outer end wall of the second slot and a portion of the inner end wall of the first slot extend obliquely of the axis of the outer pipe at approximately the same angle.

9. A coupling as defined in claim 1 wherein at least a portion of the outer end wall of the second slot extends obliquely of the axis of the outer pipe and at least a portion of the inner end wall of the first slot extends substantially perpendicularly to the axis of the outer pipe.

10. A coupling as defined in claim 1 wherein:
    said band is an open loop with its free ends extending radially outwardly,
    and said tightening means includes at least one bolt and nut extending through said free ends for drawing the ends together.

11. A coupling as defined in claim 10 wherein:
    said band comprises a single piece of sheet metal and each said member is folded back on itself to provide a double layer of sheet metal.

12. A coupling as defined in claim 1 wherein:

said band has a cross-section including a roundish sector and a radially projecting channel-shaped sector, said channel-shaped sector comprises a pair of members extending outwardly from the roundish sector and being separated from each other at the outer ends to form an opening in the band, a spline disposed between the members and having a pair of surfaces which are respectively opposite said pair of members, one of said surfaces of said spline being concave, a bar disposed against one member opposite said concave surface of the spline, said tightening means including at least one bolt and nut with the bolt extending laterally through the side bar, members and spline and being adapted to force the members against the respective surfaces of the spline, whereby the band is stretched around said overlap region.

13. In a coupling for a pipe lap joint of the type comprising:

an inside pipe and an outside pipe having respective pipe walls in telescoping relationship which provides an overlap region on the end of each pipe, said overlap region on the outside pipe including a pair of slots, the first slot of said pair having first and second sidewalls extending inwardly from the end of said outside pipe and terminating in an inner end wall within said overlap region, and the second slot of said pair being spaced inwardly from the end of said outer pipe and circumferentially offset from said first slot and having first and second sidewalls extending inwardly from an outer end wall, a clamping band disposed around said outside pipe and covering said second slot and the inner end of said first slot, tightening means for clamping said band around said outside pipe to clamp the pipes together and collapse said outer pipe into close fitting engagement with said inner pipe within the overlap region to cause sealing engagement of said outer pipe with said inner pipe and with said band, the improvement wherein:

the length of said first slot is in the range of substantially five times the wall thickness of the pipe to substantially the sum of the maximum offset of the pipe end and five times the wall thickness of the pipe, and the length of said second slot is greater than the length of said first slot.

14. A coupling as defined in claim 13 wherein said second slot includes:

a first transverse slot portion extending circumferentially around said outer pipe from a point along said first sidewall adjacent said second slot inner end, and a second transverse slot portion extending circumferentially around said outer pipe from a point along said second sidewall adjacent said second slot inner end and opposite said first transverse slot portion.

15. A coupling as defined in claim 13 wherein:

said first sidewalls of the first and second slots are disposed with the outer end of the first sidewall of the second slot circumferentially offset from the inner end of the first sidewall of the first slot, said first sidewalls being connected together by a frangible bridging segment of the wall of the outside pipe, and said end walls extend transversely of said first sidewalls, whereby said first and second slots are substantially isolated from each other when said frangible bridging segment is deformed and when it is fractured into two parts by collapse of the overlap region of said outer pipe.

16. A coupling as defined in claim 15 wherein said bridging segment is disposed axially from the shortest edge of the pipe end by a distance of substantially five times the wall thickness of the pipe.

17. A punch and die set for punching first and second slots in the wall of a pipe near one end of the pipe, the first slot having first and second sidewalls extending axially inwardly from the end of the pipe and terminating in an inner end wall and the second slot being spaced inwardly from the end of the pipe and being circumferentially offset from the first slot and having first and second sidewalls extending axially inwardly from an outer end wall, said die being a horn die having a cylindrical section provided with a pair of die cavities corresponding to said first and second slots, respectively, and having an annular abutment member, said die being adapted to receive a pipe disposed over said cylindrical section with the inside diameter of the pipe seated thereon and the end of the pipe in engagement with said abutment member, said pipe end defining a plane which is approximately perpendicular to the axis of the pipe subject to a predetermined maximum out-of-square tolerance, said first die cavity extending axially of said die and having a first end wall in axial alignment with said annular abutment member and having a second end wall at a distance from the first end wall substantially equal to the sum of said predetermined maximum out-of-square tolerance plus substantially five times the wall thickness of said pipe.

said second die cavity extending axially of said die and being circumferentially offset from said first die cavity and having first and second end walls, the second end wall of the first die cavity being adjacent the first end wall of the second die cavity, said second die cavity having a greater axial length than that of said first die cavity, said punch having a pair of punch faces mating with said first and second die cavities, respectively, whereby said punch and die set is operative to form said first slot in said pipe with a length of at least about five times the wall thickness of said pipe regardless of the angular orientation of said pipe on said horn die.

18. A punch and die set as defined in claim 17 wherein:

said first cavity includes first and second sidewalls extending between the first and second end walls of said first cavity, and said second cavity includes first and second sidewalls extending between the first and second end walls of said second cavity, said first sidewalls of said first and second cavities being in axial alignment with each other and said second sidewalls of said first and second cavities being circumferential offset from each other, said second end wall of said first die cavity being in alignment with said first end wall of said second die cavity.

* * * * *